D. W. McNEIL.
PROCESS OF MOLDING CERAMICS.
APPLICATION FILED MAR. 19, 1917.

1,311,410.

Patented July 29, 1919.

UNITED STATES PATENT OFFICE.

DANIEL W. McNEIL, OF CINCINNATI, OHIO, ASSIGNOR TO THE JOHN DOUGLAS COMPANY, OF CINCINNATI, OHIO, A CORPORATION OF OHIO.

PROCESS OF MOLDING CERAMICS.

1,311,410.  Specification of Letters Patent.  Patented July 29, 1919.

Application filed March 19, 1917. Serial No. 155,715.

*To all whom it may concern:*

Be it known that I, DANIEL W. McNEIL, a citizen of the United States of America, and resident of Cincinnati, in the county of Hamilton and State of Ohio, have invented a new and useful Improvement in Processes of Molding Ceramics, of which the following is a specification.

An object of my invention is a process of molding ceramics such as lavatories having interior indirect passages, in such a manner that there will be no burs of ceramic material left projecting within the passages to catch dirt and grease.

A further object is a process of molding ceramics having interior indirect passages, in such a manner that the walls of the passages and those of the ceramic are molded simultaneously and integrally.

These and other objects are attained in the process described in the following specification and illustrated in the accompanying drawings, in which.

Figure 3:
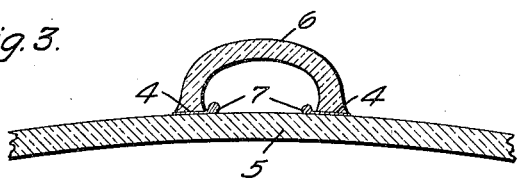
Fig. 3 is a fragmental sectional view taken in the same relative position as Fig. 2, but of a lavatory molded in accordance with the usual process.

In the molding of ceramics such as lavatories, by means of processes heretofore employed, the indirect passages formed therein, are molded by attaching to the wall of the ceramic, after it has been molded, a separately molded piece which is caused to adhere to the walls of the ceramic by separate and particularly adhesive coatings of clay spread upon the surface to be brought into contact with one another. In Fig. 3 this process is illustrated, clay coatings 4, commonly known as slips, being laid between the wall 5 of the lavatory and the piece 6 which is to be attached thereto. After the attached piece 6 and the wall 5 have been fired, the slips 4 result in the formation of substantially one piece of fired clay. However the objection to this method is that in pressing piece 6 against wall 5 the ends of the interposed slips 4 bulge beyond the edges of piece 6 and result in the formation of inaccessible burs 7 on the interior of the passage thus creating obstructions therein. This is objectionable in that such obstructions result in the accumulation of dirt and grease in the passage. An additional disadvantage of this method of construction is that the joint between the pieces 5 and 6 is not as strong as it would be were the pieces formed integrally.

In my improved process I locate a core of the shape of the internal passage, in the clay, while it is being assembled to the form of the object, and before pressure is brought upon the clay to compact it. I then compact the clay in the usual manner and after the pressure is released I remove the core, trim, dry, glaze and bake the object.

Figure 1:
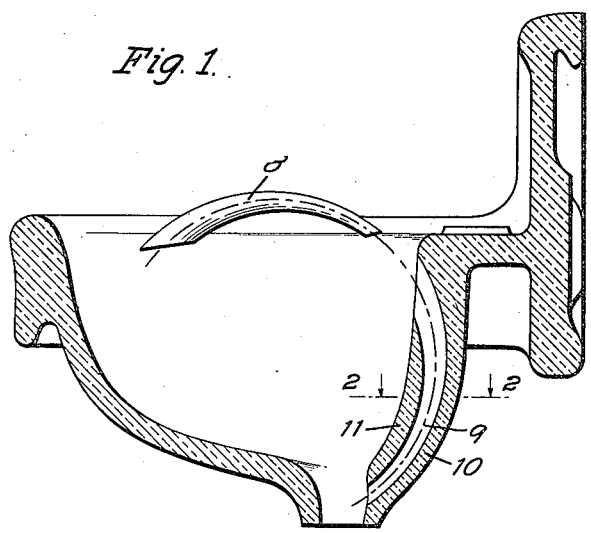
Figure 1 is a transverse sectional elevation of a lavatory molded in accordance with my improved process, showing the last step in the molding operation.
Figure 2:
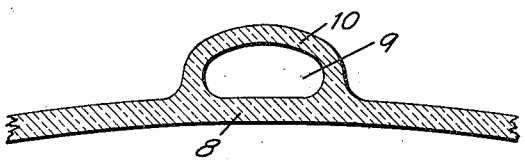
Fig. 2 is a fragmental sectional view taken on the line 2—2 of Fig. 1, upon an enlarged scale.

In the process of molding the lavatory illustrated in the accompanying drawings, the clay is first placed in the mold provided for forming the lavatory, sufficient being located at the back of the bowl portion thereof to support a core 8 of the shape of the overflow passage 9 to be molded therein. After the core has been located in position additional clay is packed around it so as to embed it completely. Thus the back wall 10 of the passage 9 is formed before the core 8 is placed in position and the front wall 11 is formed after the core is placed in position. With core 8 thus located and the other portions of the lavatory molded to their embryonic formation, the entire lavatory is subjected to pressure in the suitably constructed mold. After the clay has been pressed, the core is removed by trimming around the edges of the clay at the ends of the passage in which the core is located, and then slipping the core therefrom. In the construction disclosed in Fig. 1, the core is curved and tapers from its upper to its lower end to present a horn-like appearance. Thus it is removed from the passage very easily, it being loosened immediately upon the slightest movement thereof from its molded position. The axis of the core and that of the passage, lie in the arc of a circle so that the removal of the core from the passage will be easy and prevent the breakage of the molded clay around it. By molding the passage, a section of which is illustrated in Fig. 2, in this manner, the material of the bowl and the passage present no line of demarcation which might lead to fractures between them or of the formation of burs in the passage, such as disclosed in Fig. 3. The passage thus formed is as smooth as the surface of the core which is embedded in the clay in order to mold it.

My improved process of molding ceramics having indirect passages may be employed in the molding of other articles than that disclosed in the drawings and which have passages the shape of which facilitates the removal of the cores employed for molding them.

Having thus described my invention, what I claim is:

1. A method of molding ceramics having interior indirect passages, consisting in assembling the clay into embryonic form of the object to be molded, embedding loosely therein a core having regularly curved outlines, molding the clay around the core and to the shape of the article to be molded, removing the core, and firing the molded clay.

2. A method of molding ceramics having interior indirect passages, consisting in assembling the clay into embryonic form of the object to be molded, embedding loosely therein a core having regularly curved and tapered outlines, molding the clay around the core and to the shape of the article to be molded, removing the core, and firing the molded clay.

In testimony whereof I have hereunto subscribed my name this 15th day of March, 1917.

DANIEL W. McNEIL.

Witnesses:
  WALTER F. MURRAY,
  W. THORTON BOGERT.